Sept. 25, 1962  A. DIENY  3,055,536
CLOSING DEVICE FOR A PRESSURE CONTAINER
Filed May 9, 1958
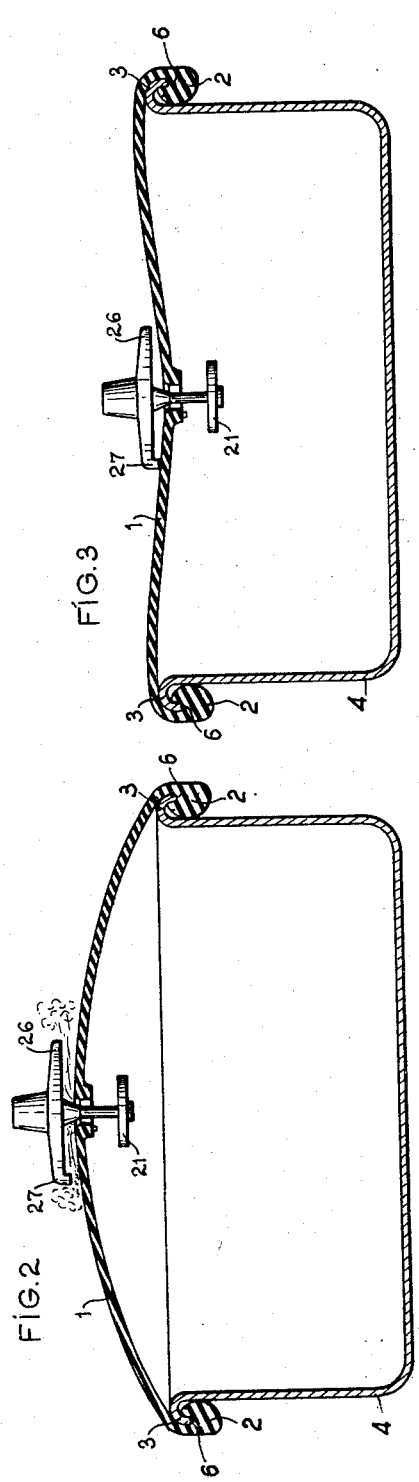
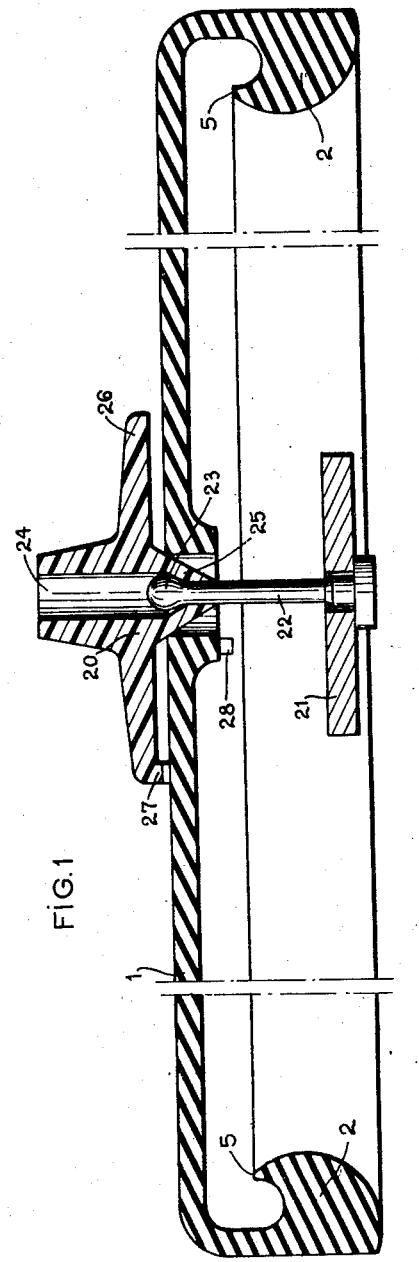
Inventor
ALFRED DIENY
By Toulmin & Toulmin
Attorneys

United States Patent Office 3,055,536
Patented Sept. 25, 1962

3,055,536
CLOSING DEVICE FOR A PRESSURE CONTAINER
Alfred Dieny, 18 Rue de la Gare, Rungis, France
Filed May 9, 1958, Ser. No. 734,366
Claims priority, application France Apr. 19, 1958
7 Claims. (Cl. 220—44)

The present invention relates to a cover fitted to stand elastic deformations and to the combination of this cover with a container to limit the pressure generated inside said container. The invention is particularly suitable for the kitchen boiling pots designated as "pressure cookers."

The cover is particularly noteworthy in that it includes, in combination:

Means allowing to fix it, through a manual elastic deformation, in a steam-tight way on any container provided with means to receive said cover;

Means to limit the pressure inside the container.

As a form of embodiment and to show a steam-tight jointing between the container and the cover, a cover shall be described hereafter, which is being fitted to stand an elastic deformation and is provided with one or several collars intended to allow the hooking round the upper periphery of the container, the latter having therefore a flared or folded flange.

The invention will be readily understood with reference to the annexed drawings in which:

FIG. 1 is a vertical sectional view of a cover in accordance with the invention;

FIG. 2 is a vertical section of a container equipped with a cover as shown in FIG. 1 when the pressure inside the container has reached a given value;

FIG. 3 is a section similar to the one of FIG. 2, but where the cover is shown when the pressure in the container has a value smaller than the value of the atmospheric pressure.

In FIG. 1, the cover 1, made of an elastically distortable material, for instance of synthetic rubber able to stand the heat and the culinary processes, particularly made of neoprene, has a peripheral collar 2 intended to hook the cover under the peripheral flange 3 of a container 4, as illustrated in FIG. 2.

To set cover 1 on the container 4, this cover is manually elastically distorted so that the edge 5 of the peripheral collar 2 is entirely engaged under the edge 6 of the peripheral flange 3 of said container 4.

The means provided to secure the limitation of the pressure inside the container 4 are, as shown in the figures, supported by the cover and consist in a valve 20 provided with a counterweight 21 under the cover.

In FIG. 2 the escape of steam produced when the pressure inside the container 4 has reached a given value is shown.

The distoratable cover 1, which is tightly hooked under the flange 3 of the container 4, has bulged out; when the predetermined pressure is reached, the valve is lifted and an escape of steam in the atmosphere is produced (see FIG. 2).

Admitting that the container 4 is, for instance, a kettle for the pressure cooking of food, a sterilizer or any other internal pressure apparatus, the pressure limiting valve when working, warns the utilizer as well through the hissing of the escaping steam as through its own dancing. Under the action of the internal pressure, this valve is lifted up, the steam escapes and the valve falls back on its seat: as this seat is elastic, it sends back anew the valve upwards, giving rise to a new escape of steam and so on until the pressure inside the container falls back to the given value. These movements are very fast, have an appreciable amplitude, are quite conspicuous and constitute an improvement in relation to the known systems. The operator reduces the heating intensity so that the internal pressure settles anew at a value equal to or slightly lower than the predetermined value. The cooking goes on, without escape of steam, the valve functioning like a digester.

This uninterrupted dancing of the valve prevents any clogging of the valve seat.

According to FIG. 1, the valve equipped with a counterweight is advantageously made of three elements: the valve proper 20, the counterweight 21 and the stem 22.

Each of the two elements 20, 22 (or at least one of them) is made of a material slightly flexible and elastic, for instance of the easily distortable plastic matter named "Rilsan." The stem 22 of the counterweight bears a knob 23 at its upper end. A channel 24 is bored through the valve 20 and the diameter of the mouth 25 of this channel 24 is very slightly smaller than the diameter of the knob 23. Thanks to the elasticity of the plastic matter, these two parts can be separated by a light pulling, thereby facilitating their cleaning. Lugs 28 prevent the sticking of the counterweight 21 against the mouth of the cover.

When the closing device according to the invention is mounted on a container in which the pressure may, at given moments, have a value much smaller than the value of the atmospheric pressure, it is necessary to foresee a self action air inlet to prevent the driving in of the elastic cover or even its bursting (FIG. 3). This is particularly the case of the pressure cookers; when heating is stopped, the steam in the cooker condenses and an important vacuum is created which prevents the removal of the cover and may even lead to its destruction.

To remedy this drawback, when the cover has an elastic upper part, the valve proper 20 (FIG. 1) is provided with a small flange 26 bearing upon its lower face three studs 27 of a small height. When cover 1 is substantially horizontal (FIG. 1), the conical valve 20 rests upon its seat, the studs having no action. On the contrary (FIG. 3), when the cover 1 is depressed downwards (FIG. 3), the studs 27 come into contact with this cover and keep valve 20 slightly apart from its seat, thus allowing the outer air to enter into the container.

What I claim is:

1. Closing device for a pressure container provided with a hooking groove, inclding a cover entirely made of an elastic material, and provided with an opening, the periphery of said cover being formed in a distortable collar adapted to engage the hooking groove of the container to be closed, whereby said cover is steam-tightly locked on said container without further tightening and locking members, a tubular member, the inner channel of which opens at one end in the atmosphere, and is formed at the other end in a conical valve seat, the lower part of said tubular member being formed in a conical flap valve head, topped by a small lateral flange provided on its face facing said flap valve head with studs adapted to come into contact with the cover, the height of said studs being so that the flap valve head will tightly close the opening in the cover when the pressure inside the closed container is at least equal to the atmospheric pressure, and the elastic cover is consequently swelled upwards, whereas it opens said opening in the cover when the inner pressure is below the atmospheric pressure, after condensing of the steam, whereby the crushing of the cover is prevented, a valve head inserted in said tubular member so as to cooperate with its lower conical seat, and extending in a stem protruding from the tubular member below the cover, and a counterweight attached to the lower end of said stem, whereby the lifting of said valve head from its conical seat is only allowed when the pressure in the closed container has a given value above the atmospheric pressure.

2. Device according to claim 1 in which studs are arranged under the valve seat to stop the lifting of the counterweight under the action of the inner pressure and to prevent its sticking.

3. Device according to claim 1 in which one at least of the two parts of the valve formed by the tubular member and the head engaged in its inner channel is made of an easily distortable material, so as to easily take out said head and its stem from its seat by means of a distortion.

4. A culinary vessel for cooking foods under limited pressure, comprising in combination a container having a peripheral flange, a cover for said container, said cover being at least partly made of an elastic rubber-like material having a substantially central opening and a peripheral distortable collar for steam-tightly engaging the flange of the container, and a pressure relief valve, comprising a stem extending with play through the opening in the cover, an upper valve portion and a counterweight interconnected by said stem, said valve being adapted to be lifted by the pressure in said vessel only when the pressure increases above the fixed cooking pressure, and to fall back onto the cover with its upper valve portion when the pressure has decreased, and said upper valve portion being further provided with a lateral flange supporting on its lower face studs of small height adapted to come into contact with the cover when said cover is depressed downwardly by an inner underpressure, whereby said upper valve portion is lifted above the opening in the cover.

5. A culinary vessel according to claim 4, in which studs are arranged under the opening in the cover to stop the lifting of the counterweight under the action of the inner pressure and to prevent its sticking.

6. A culinary vessel according to claim 4, in which the upper valve portion is constituted by a tubular member, the inner channel of which is formed at its lower end in a conical seat, and the stem for attachment of the counterweight is provided at its upper end with a knob adapted to be inserted in the inner channel of said tubular member so as to cooperate with its inner conical seat.

7. A culinary vessel according to claim 6, in which either one of the tubular member and the stem knob is made in an easily distortable material, so as to be easily separable from each other for cleaning purpose.

References Cited in the file of this patent
UNITED STATES PATENTS

| | | |
|---|---|---|
| 700,398 | Ambler | May 20, 1902 |
| 2,174,437 | Collins | Sept. 26, 1939 |
| 2,228,435 | Binon | Jan. 14, 1941 |

FOREIGN PATENTS

| | | |
|---|---|---|
| 843,804 | Germany | July 14, 1952 |
| 892,558 | Germany | Oct. 8, 1953 |
| 406,778 | Italy | Dec. 10, 1943 |
| 559,120 | Italy | Mar. 15, 1957 |
| 662,889 | Great Britain | Dec. 12, 1951 |